United States Patent [19]
Kelly

[11] 3,966,054
[45] June 29, 1976

[54] SHOCK ABSORBER FOR TUBULAR STORAGE OR DRILL STANDS ON A DRILLING SHIP

[75] Inventor: Robert R. Kelly, Hoffman Estates, Ill.

[73] Assignee: BJ-Hughes Inc., Long Beach, Calif.

[22] Filed: May 22, 1975

[21] Appl. No.: 579,985

[52] U.S. Cl. .............................. 211/60 S; 267/34; 267/136
[51] Int. Cl.² .......................................... A47F 7/00
[58] Field of Search ............. 267/125, 136, 137, 34; 211/60 S, 182; 214/2.5; 248/44

[56] References Cited
UNITED STATES PATENTS

| 690,676 | 1/1902 | Tait | 267/136 |
| 3,339,747 | 9/1967 | Sherman | 211/60 S |
| 3,889,934 | 7/1975 | Kamman | 267/34 |

*Primary Examiner*—James B. Marbert
*Attorney, Agent, or Firm*—John O. Evans, Jr.

[57] ABSTRACT

Means are described for absorbing energy when a drill string has been lowered into a tube for storage. The apparatus comprises a piston, orifice, fluid and spring in combination with a storage tube capable of holding a string of drill pipe.

3 Claims, 2 Drawing Figures

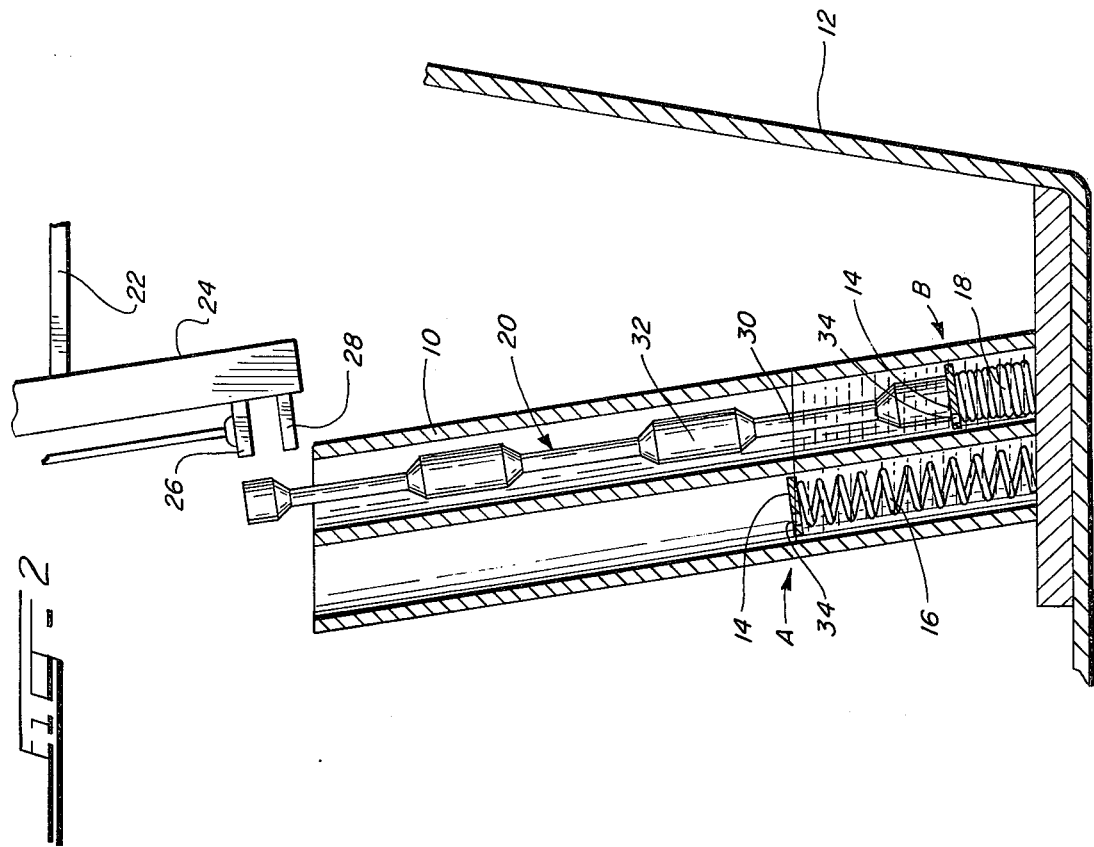
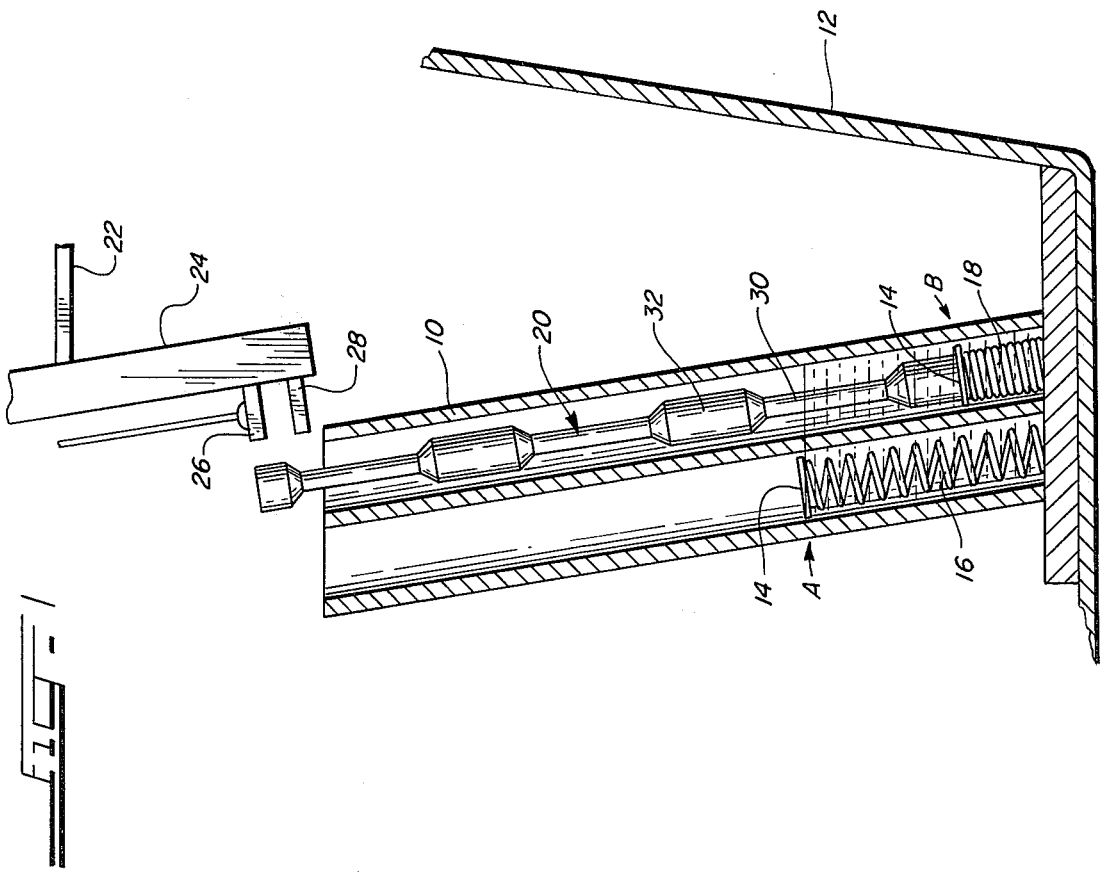

SHOCK ABSORBER FOR TUBULAR STORAGE OR DRILL STANDS ON A DRILLING SHIP

BACKGROUND OF THE INVENTION

In an offshore oil well drilling vessel, it is necessary to rack drill pipe during drilling operations. The drill pipe may be in approximately 30 foot sections, the sections being joined by tool joints which are made and/or broken-out, as the case may be. When broken-out, the pipe may be stored in the racks generally in 90 foot lengths or three sections.

Various racking systems have been devised which are located in the hold of the drilling vessel and below the drilling platform. The lengths of drill pipe are handled by a hoist and are lowered into a pipe rack which may be a box to receive a number of the drill stands. Tubular racks are also known; at the bottom of each tube, there is a solid structure to support the drill pipe and tool joints. It is desirable to handle the drill strings rapidly and also in such fashion to avoid damage to threaded portions of the tool joints; thus in the absence of means to absorb shock when a drill string is lowered into its rack, damage to the string or tool joint can be expected. This reduces the life expectancy of the drill string, increasing the cost of drilling.

It is possible to lower the drill string at a creep rate to avoid damage; this lengthens the total time for handling the string and thus adds to the cost of drilling.

THE INVENTION

According to this invention, a racking arrangement comprises a plurality of closed bottom tubes extending into the hold of the drilling ship from the drilling platform, each to receive a length of drill pipe, for example of multiple sections, generally three, joined together by suitable tool joints. At the bottom of each racking tube is an energy absorption arrangement to reduce the impact loading of pipe and tool joints into the racking tubes.

The energy absorption apparatus comprises a piston received in each racking tube, a spring urging the piston to a ready position for receiving a stand of drill pipe and a fluid, such as drilling mud or the like, contained in the racking tube by the piston. The piston is provided with a bleed orifice or is sized to have a diametral clearance in the tube.

When a pipe is lowered into a racking tube, impact is made on the piston; the velocity of the pipe is reduced as energy is dissipated in the fluid passing through the orifice or around the clearance and by compression of the spring. At impact, the racker head transferring the pipe string may be disengaged, retracted and raised to begin seeking the next string. The creep rate, previously necessary is eliminated, regardless of string length. When the pipe string is raised, the piston returns to its ready position because of the spring.

THE DRAWINGS

FIG. 1 is a sectional view illustrating the preferred embodiment of this invention; and FIG. 2 is a sectional view, similar to FIG. 1 illustrating another embodiment of this invention.

DETAILED DESCRIPTION

Looking now at FIG. 1 of the drawings, there is illustrated the preferred embodiment of this invention in which a plurality of closed bottom racking tubes 10 are suitable supported in the hold of a ship, the hold of which is identified as 12 and below the drilling platform, not shown. Each racking tube 10 contains a piston 14 urged upwardly by a coil spring 16, and also a quantity of fluid 18 such as drilling mud. The piston 14 is of a diameter less than the inner diameter of the tube 10, so that when a string of drill pipe 20 is lowered into the tube, the impact is made on the piston 14. Energy is dissipated in the fluid which flows around the piston 14 and also in the compression of the spring 16. Thus the piston moves from its ready position A to its support position B. Upon removal of the pipe string from the racking tube, the spring 16 returns the piston 14 to its ready position A.

The pipe string is handled by a racking arm 22 on a boom 24 having a lifting head 26 and a guide head 28, all of which are controlled at the drilling platform under the control of drilling personnel. All of these devices are conventional and known in the art and are not described further.

The drill string 20 is composed of lengths of drill pipe 30 connected by tool joints 32, and, as illustrated, is in three-length sections, or if each section is approximately 30 feet in length, the stand is approximately 90 feet in length.

In FIG. 2, a second embodiment is illustrated in which the piston 14 is provided with one or more orifices 34 for the escape of fluid 18 when the drill string 20 is lowered against the piston 14. Otherwise the construction of the arrangement is the same. The operation of this embodiment is also the same as that of the preferred embodiment.

I claim:
1. Pipe racking apparatus which comprises:
    at least one closed bottom racking tube;
    a piston in said tube having an area less than the surface area of a plane transverse to said tube;
    said piston being contacted by pipe upon racking and storage in said tube;
    a coil spring urging said piston upwardly in said racking tube to a pipe receiving position;
    a fluid in said tube contained by said piston;
    whereupon energy from impact upon said piston by a pipe being racked is dissipated in said fluid which piston moves downwardly in said racking tube, said piston being urged to move upwardly in said tube by said spring upon removal of said pipe therefrom.
2. Apparatus as recited in claim 1 wherein said piston has a diametrical clearance with the interior of said racking tube, so that fluid flows past said piston upon impact of a pipe string being racked on said piston.
3. Apparatus as recited in claim 1 wherein said piston has at least one orifice therethrough, so that fluid flows through said orifice upon impact of a pipe string being racked on said piston.

* * * * *

PO-1050
(5/69)

UNITED STATES PATENT OFFICE
CERTIFICATE OF CORRECTION

Patent No. 3,966,054      Dated June 29, 1976

Inventor(s) Robert R. Kelly

It is certified that error appears in the above-identified patent and that said Letters Patent are hereby corrected as shown below:

Front page, in the title, "SHOCK ABSORBER FOR TUBULAR STORAGE OR DRILL STANDS ON A DRILLING SHIP" should be --SHOCK ABSORBER FOR TUBULAR STORAGE OF DRILL STANDS ON A DRILLING SHIP--.

Col 1, in the title, "SHOCK ABSORBER FOR TUBULAR STORAGE OR DRILL STANDS ON A DRILLING SHIP" should be --SHOCK ABSORBER FOR TUBULAR STORAGE OF DRILL STANDS ON A DRILLING SHIP--.

Signed and Sealed this

Fifth Day of October 1976

[SEAL]

Attest:

RUTH C. MASON
*Attesting Officer*

C. MARSHALL DANN
*Commissioner of Patents and Trademarks*